US012735935B2

(12) United States Patent
Nishino et al.

(10) Patent No.: US 12,735,935 B2
(45) Date of Patent: Sep. 15, 2026

(54) ENTRY SYSTEM AND ENTRY CONTROL METHOD

(71) Applicant: HONDA MOTOR CO., LTD., Tokyo (JP)

(72) Inventors: Mitsunori Nishino, Tokyo (JP); Tomoya Okuda, Tokyo (JP); Seonghun Lee, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 12 days.

(21) Appl. No.: 19/060,970

(22) Filed: Feb. 24, 2025

(65) Prior Publication Data

US 2025/0305345 A1 Oct. 2, 2025

(30) Foreign Application Priority Data

Mar. 29, 2024 (JP) ................................ 2024-055944

(51) Int. Cl.

| | |
|---|---|
| ***E05F 15/73*** | (2015.01) |
| ***B60R 25/01*** | (2013.01) |
| ***B60R 25/25*** | (2013.01) |
| ***B60R 25/30*** | (2013.01) |
| ***B60R 25/31*** | (2013.01) |

(52) U.S. Cl.

CPC .............. *E05F 15/73* (2015.01); *B60R 25/01* (2013.01); *B60R 25/25* (2013.01); *B60R 25/305* (2013.01); *B60R 25/31* (2013.01); *E05F 2015/767* (2015.01); *E05Y 2400/8505* (2024.05); *E05Y 2900/531* (2013.01)

(58) Field of Classification Search

CPC ....... B60R 25/01; B60R 25/25; B60R 25/255; B60R 25/257; B60R 25/31; B60R 25/305; E05F 2015/763; E05F 2015/765; E05F 2015/767; E05Y 2400/8505

See application file for complete search history.

(56) References Cited

U.S. PATENT DOCUMENTS

2018/0016835 A1 1/2018 Ichinose
2022/0219643 A1* 7/2022 Hanson ................ G06V 40/172

FOREIGN PATENT DOCUMENTS

JP 2018-9386 A 1/2018

* cited by examiner

*Primary Examiner* — Erin D Bishop
*Assistant Examiner* — Joseph Thompson
(74) *Attorney, Agent, or Firm* — Rankin, Hill & Clark LLP

(57) ABSTRACT

An entry system includes: an acquisition unit configured to repeatedly acquire a face image of a target person approaching a moving body from a camera; an authentication unit configured to authenticate that the target person is a registered user based on the face image; a control unit configured to automatically open a door of the moving body when the authentication unit succeeds in authentication, the authentication unit outputs the notice indicating whether or not the authentication is a success from an output device every time the authentication is executed, and when the authentication becomes a success after the authentication becomes a failure for a prescribed number of times, the control unit makes a mode of movement of the door at the time of automatically opening the door different from a mode when the authentication becomes a success with the number of times less than the prescribed number of times.

8 Claims, 4 Drawing Sheets

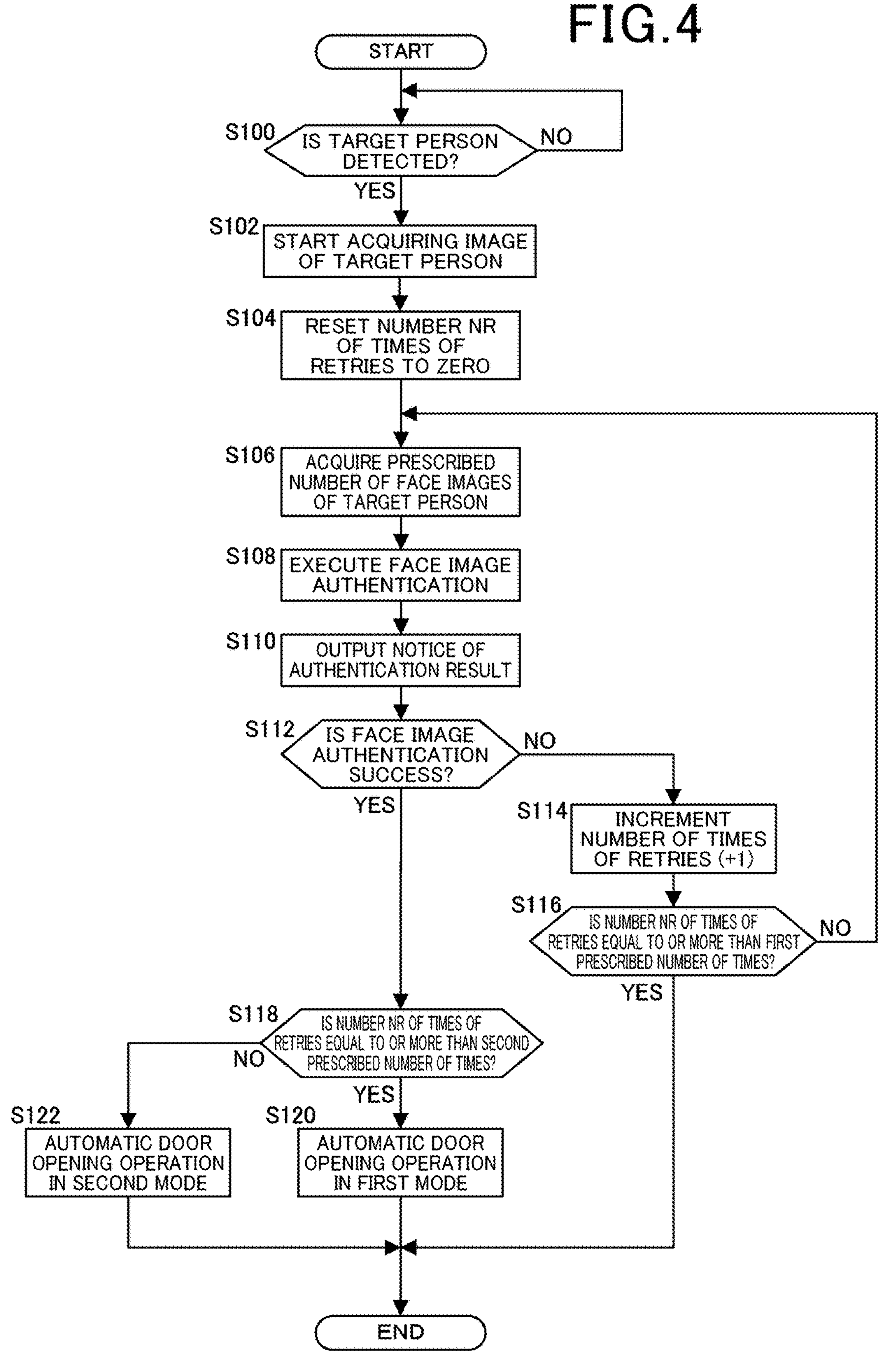
FIG.4
START
S100
IS TARGET PERSON DETECTED?
NO
YES
S102
START ACQUIRING IMAGE OF TARGET PERSON
S104
RESET NUMBER NR OF TIMES OF RETRIES TO ZERO
S106
ACQUIRE PRESCRIBED NUMBER OF FACE IMAGES OF TARGET PERSON
S108
EXECUTE FACE IMAGE AUTHENTICATION
S110
OUTPUT NOTICE OF AUTHENTICATION RESULT
S112
IS FACE IMAGE AUTHENTICATION SUCCESS?
NO
YES
S114
INCREMENT NUMBER OF TIMES OF RETRIES (+1)
S116
IS NUMBER NR OF TIMES OF RETRIES EQUAL TO OR MORE THAN FIRST PRESCRIBED NUMBER OF TIMES?
NO
YES
S118
IS NUMBER NR OF TIMES OF RETRIES EQUAL TO OR MORE THAN SECOND PRESCRIBED NUMBER OF TIMES?
NO
YES
S122
AUTOMATIC DOOR OPENING OPERATION IN SECOND MODE
S120
AUTOMATIC DOOR OPENING OPERATION IN FIRST MODE
END

ENTRY SYSTEM AND ENTRY CONTROL METHOD

INCORPORATION BY REFERENCE

The present application claims priority under 35 U.S.C. § 119 to Japanese Patent Application No. 2024-055944 filed on Mar. 29, 2024. The content of the application is incorporated herein by reference in its entirety.

BACKGROUND OF THE INVENTION

Field of the Invention

The present invention relates to an entry system and an entry control method.

Description of the Related Art

In recent years, an approach of providing access to a sustainable transportation system considering even vulnerable people like aged people, people with disabilities and children among traffic participants is gaining momentum. Towards the realization, the focus is on research and development for further improving traffic safety and convenience through development regarding vehicle accessibility.

Japanese Patent Laid-Open No. 2018-9386 discloses technology of stopping opening/closing of a door before the door contacts an obstacle when opening the door by a door opening/closing system if the obstacle is detected by a sensor which detects obstacles around the door.

Now, for vehicle accessibility, a problem is that a series of automatic operations performed by a vehicle before a user approaching the vehicle gets into the vehicle through authentication are safe and secure for the user.

In a case of authenticating a user who intends to perform entry into a vehicle using physical data such as a face image, when an authentication operation is repeatedly executed due to a failure in authentication, a target person tends to approach a camera or the like for capturing a face image, that is provided near a door. After such repetitive execution of the authentication operation, if the authentication unexpectedly becomes a success and the door opens when the target person is right near the door, it may result in inconvenience that the target person contacts the door or the target person is surprised by movement of the door or the like.

In order to solve the above-described problem, an object of the present application is to make movement of a door when authentication is a success be an operation that is safe and secure for a user in an entry system of authenticating a user who intends to perform entry into a moving body and automatically opening a door, thereby contributing to development of a sustainable transportation system.

SUMMARY OF THE INVENTION

One mode of the present invention aspect is an entry system including: a camera provided in a moving body; an output device provided in the moving body and configured to output a notice to outside of the moving body; an acquisition unit configured to repeatedly acquire a face image of a target person approaching the moving body from the camera; an authentication unit configured to authenticate that the target person is a registered user based on the face image; and a control unit configured to automatically open a door of the moving body when the authentication unit succeeds in authentication. The authentication unit outputs the notice indicating whether or not the authentication is a success from the output device every time the authentication is executed, and when the authentication becomes a success after the authentication becomes a failure for a predetermined prescribed number of times in the authentication unit, the control unit makes a mode of movement of the door at the time of automatically opening the door different from a mode when the authentication becomes a success with the number of times less than the prescribed number of times in the authentication unit.

Another mode of the present invention aspect is an entry control method conducted by a computer of an entry system which controls an opening/closing operation of a door of a moving body, and the method includes: an acquisition step of repeatedly acquiring a face image of a target person approaching the moving body from a camera provided in the moving body; an authentication step of authenticating that the target person is a registered user based on the face image; and a control step of automatically opening the door of the moving body when the authentication is a success in the authentication step. In the authentication step, a notice indicating whether or not the authentication is a success is output from an output device provided in the moving body to outside of the moving body every time the authentication is executed. In the control step, when the authentication becomes a success after the authentication becomes a failure for a predetermined prescribed number of times in the authentication step, a mode of movement of the door at the time of automatically opening the door is made different from a mode when the authentication becomes a success with the number of times less than the prescribed number of times in the authentication step.

According to the present invention aspect, it is possible to make movement of a door when authentication is a success be an operation that is safe and secure for a user in an entry system of authenticating a user who intends to perform entry into a vehicle and automatically opening a door.

BRIEF DESCRIPTION OF THE DRAWINGS

FIG. 4 is a flowchart illustrating a procedure of an operation in the entry system.

DETAILED DESCRIPTION OF THE INVENTION

Hereinafter, embodiments of the present invention will be described with reference to the drawings.

[1. Configuration of Vehicle]

Figure 1:
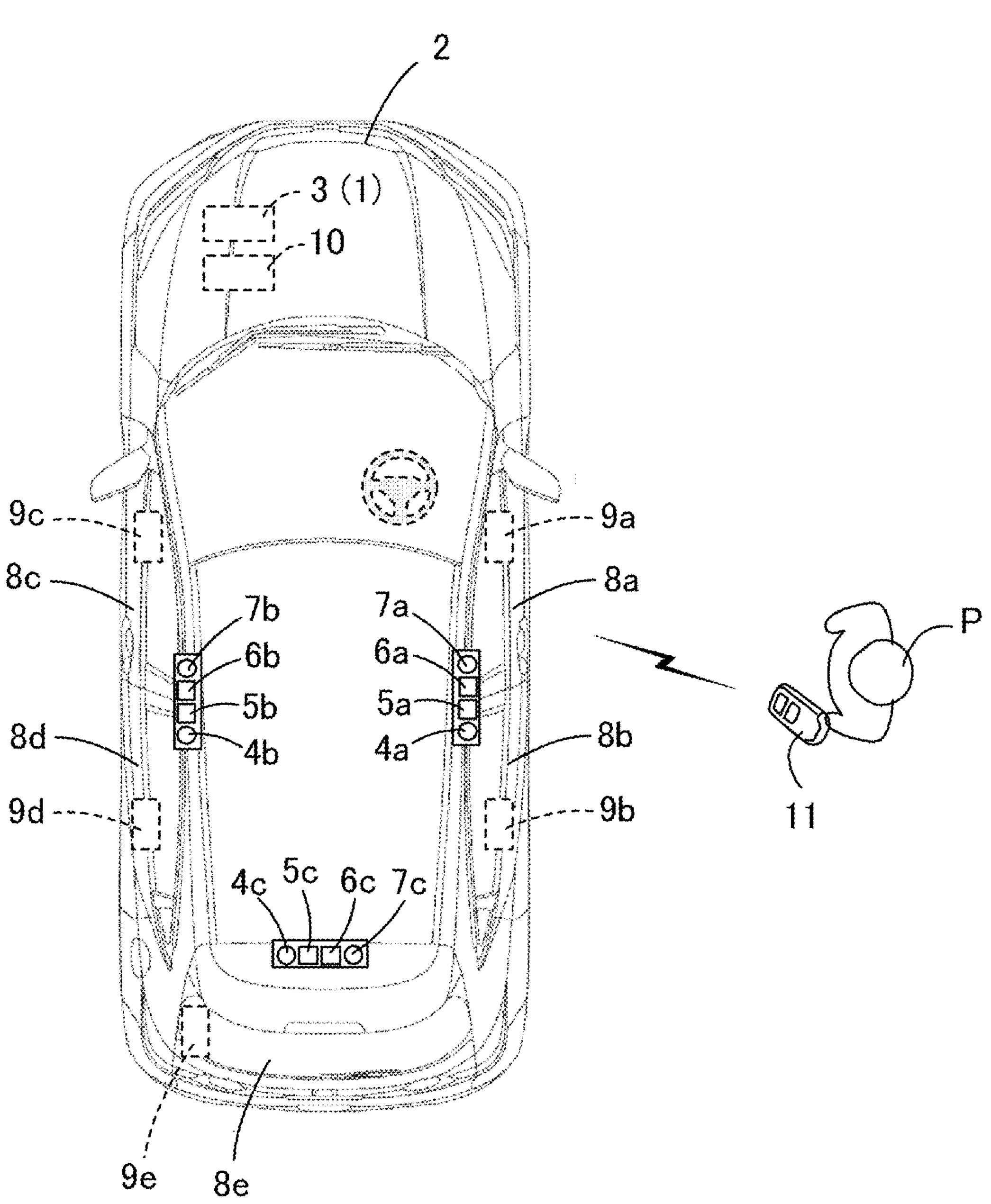
FIG. 1 is a diagram illustrating an example of a configuration of a moving body loaded with an entry system according to one embodiment of the present invention.

FIG. 1 is a diagram illustrating a configuration of a moving body 2 loaded with an entry system 1 of the present embodiment. The moving body 2 includes an entry controller 3 forming the entry system 1. The entry system 1 is loaded in the moving body 2, authenticates a target person P who is an arbitrary person who intends to perform entry into the moving body 2, and enables utilization of the moving body 2 by the target person P when it is authenticated that the target person P is a person who has proper authority to utilize the moving body 2. Here, "entry" to the moving body 2 refers at least to boarding (or getting into) the moving body 2 from outside of the moving body 2, and may further include starting utilization of a system of the moving body 2 by login to the system after boarding.

In the present embodiment, the moving body 2 is, for example, a passenger car, and may be a shared car that a plurality of persons can board. Yet, the moving body 2 is not limited to a passenger car, and may be an arbitrary moving body. Such a moving body may be, in addition to a land moving body such as a passenger car, a bus, a taxi, and a train, a marine moving body such as a ship and a submarine, or an air moving body such as an aircraft including an eVTOL (Electric Vertical Take-Off and Landing aircraft) and an airship.

On a right side part of the moving body 2, a right object detection sensor 4*a* that detects an object present on a right side of the moving body 2, a first right camera 5*a* and a second right camera 6*a* that photograph the right side of the moving body 2, and a right output device 7*a* that gives notification toward the right side of the moving body 2 are provided.

On a left side part of the moving body 2, a left object detection sensor 4*b* that detects an object present on a left side of the moving body 2, a first left camera 5*b* and a second left camera 6*b* that photograph the left side of the moving body 2, and a left output device 7*b* that gives notification toward the left side of the moving body 2 are provided.

On a rear part of the moving body 2, a rear object detection sensor 4*c* that detects an object present in a rear of the moving body 2, a first rear camera Sc and a second rear camera 6*c* that photograph the rear of the moving body 2, and a rear output device 7*c* that gives notification toward the rear of the moving body 2 are provided.

Hereinafter, the right object detection sensor 4*a*, the left object detection sensor 4*b*, and the rear object detection sensor 4*c* are noted as an object detection sensor 4 when not to be distinguished. In addition, the first right camera 5*a*, the first left camera 5*b*, and the first rear camera Sc are noted as a first camera 5 when not to be distinguished. Further, the second right camera 6*a*, the second left camera 6*b*, and the second rear camera 6*c* are noted as a second camera 6 when not to be distinguished. Also, the right output device 7*a*, the left output device 7*b*, and the rear output device 7*c* are noted as an output device 7 when not to be distinguished.

The second camera 6 has higher resolution and power consumption as compared with the first camera 5.

The first camera 5 and the second camera 6 are, for example, CCD cameras having different pixel numbers. In addition, the object detection sensor 4 is, for example, a ranging sensor capable of detecting a surrounding object and measuring a distance to the object, and is a millimeter wave radar in the present embodiment. The object detection sensor 4 is not limited to the radar, and may be an arbitrary ranging sensor capable of object detection and distance measurement. Such a sensor may be, in addition to a radar, a LiDar, or a sonar or the like.

The output device 7 notifies the outside of the moving body 2 of an authentication result of the target person P in the entry system 1. For example, the output device 7 can be an arbitrary device that gives notification by light and/or sound, such as an LED or a speaker. In the present embodiment, the output device 7 is, for example, an LED as a light emitting device.

The moving body 2 also includes a door switch 9 provided in each of doors 8 of the moving body 2 to lock and unlock a door lock of the door 8 and to open and close the door 8. The door switch 9 may include an actuator that locks and unlock the door lock of the corresponding door 8 and an actuator that opens and closes the door 8.

In the present embodiment, the moving body 2 includes, as the doors 8 and the door switches 9, a right front door switch 9*a* provided on a driver's seat door 8*a* at a right front of the moving body 2, and a right rear door switch 9*b* provided on a right rear seat door 8*b* at a right rear of the moving body 2. In addition, the moving body 2 includes a left front door switch 9*c* provided on a passenger seat door 8*c* at a left front of the moving body 2, and a left rear door switch 9*d* provided on a left rear seat door 8*d* at a left rear of the moving body 2. The moving body 2 further includes a back door switch 9*e* provided on a back door (tailgate door) 8*e* of the moving body 2.

In the present embodiment, the door 8 is a hinge door.

The moving body 2 also includes a communication device 10. The communication device 10 includes a transmitter-receiver for communicating with an electronic key 11 used to utilize the moving body 2. The electronic key 11 may be, for example, a smart key such as a FOB key, or a portable terminal such as a smartphone storing key information used to utilize the moving body 2.

[2. Configuration of Entry System]

The configuration of the entry system 1 will be described.

Figure 2:
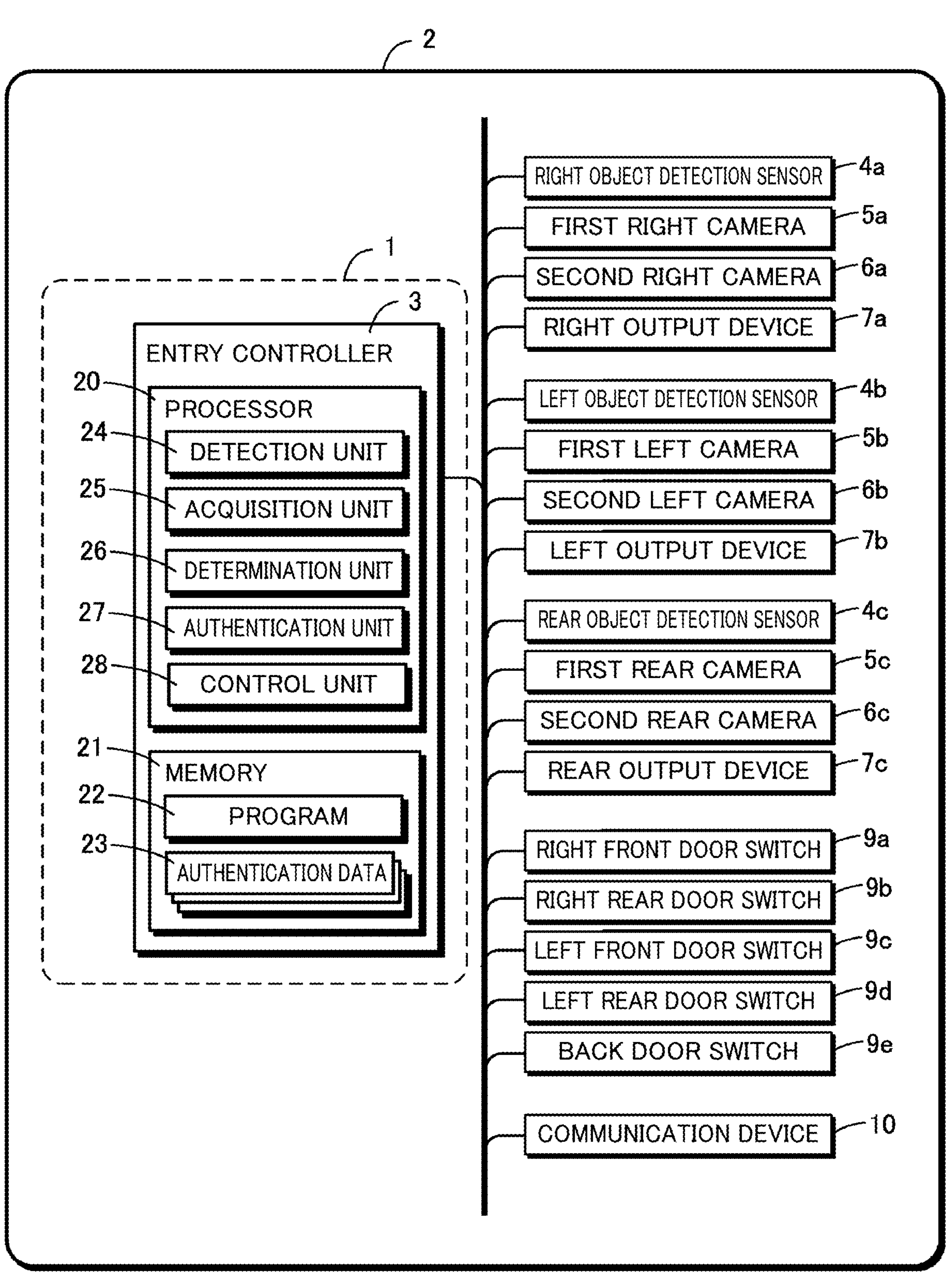
FIG. 2 is a diagram illustrating a configuration of the entry system.

FIG. 2 is a diagram illustrating the configuration of the entry system 1. The entry system 1 at least includes the entry controller 3. The entry controller 3 authenticates the target person P who is an arbitrary person who intends to perform entry into the moving body 2, and enables the utilization of the moving body 2 by the target person P when the target person P is authenticated. In the present embodiment, the authentication is conducted based on a face image acquired for the target person P.

Note that, hereinafter, a "target person" is a person defined as a target of the authentication by the entry system 1. In addition, a "user" is a registered user registered beforehand as a person who has proper authority to utilize the moving body 2, and is a person who actually utilizes the moving body 2. The target person P becomes the user when the target person P is authenticated by the entry controller 3 and the utilization of the moving body 2 is enabled.

Some of functional elements of the entry controller 3 indicated below may be provided in another device. For example, a control unit 28 (to be described later) provided in the entry controller 3 may be realized as a functional element of electronic control unit (ECU) that controls an operation of the moving body 2. In this case, the entry system 1 includes the entry controller 3 and the electronic control unit, and the entry controller 3 communicates with the electronic control unit, and makes a function of the control unit 28 be executed in the electronic control unit.

The entry system 1 may also include other instruments such as the object detection sensor 4, the first camera 5 and the second camera 6 used by the entry controller 3.

The entry controller 3 includes a processor 20 and a memory 21. The memory 21 is formed of, for example, a volatile or nonvolatile semiconductor memory and/or a hard disk device or the like. In the memory 21, authentication data 23 is preserved for each of one, two or more registered users registered beforehand as persons who have the proper authority to utilize the moving body 2.

The processor 20 is a computer including a CPU or the like, for example. The processor 20 may be configured to include a ROM in which a program is written, and a RAM for temporarily storing data or the like. Then, the processor 20 includes, as the functional elements or functional units, a detection unit 24, an acquisition unit 25, a determination unit 26, an authentication unit 27, and the control unit 28.

The functional elements provided in the processor 20 are realized by the processor 20 which is a computer executing a program 22 preserved in the memory 21. Note that the program 22 can be stored in an arbitrary computer-readable storage medium. Instead, all or some of the functional elements provided in the processor 20 may be formed of hardware including one or more electronic circuit components, respectively.

Figure 3:
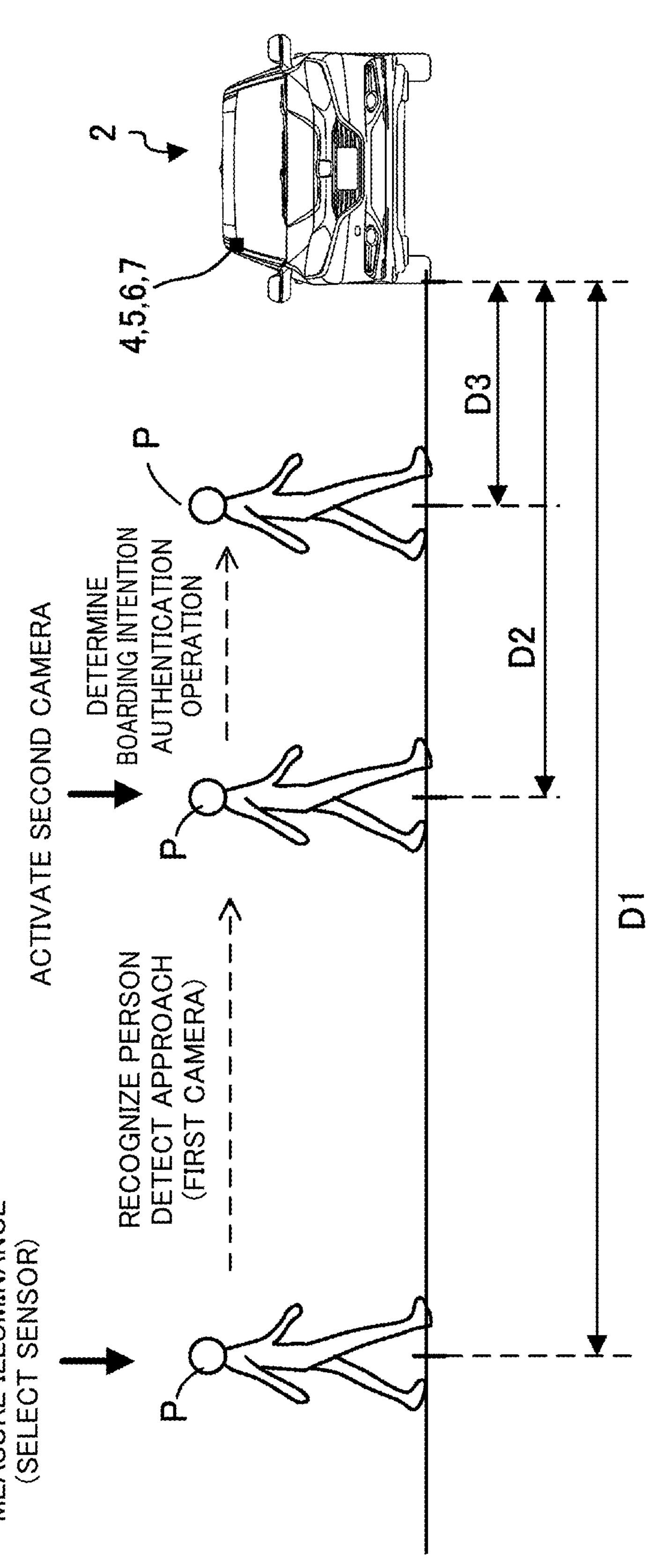
FIG. 3 is a diagram for describing a detection operation of a target person approaching the moving body.

The detection unit 24 uses the object detection sensor 4 and the first camera 5 to detect the target person P approaching the moving body 2. The detection unit 24 is operated as illustrated in FIG. 3, for example. FIG. 3 is an explanatory diagram for describing the operation from object detection to the authentication of the target person P in the entry system.

First, the detection unit 24 determines whether or not an entity (or an object) has entered a range of a prescribed distance D1 determined beforehand from the moving body 2 by the object detection sensor 4. The entity may be an arbitrary object including a living thing and a nonliving thing. When the entity has entered the range of the prescribed distance D1, the detection unit 24 activates the first camera 5 close to the object detection sensor 4 which has detected the entity.

The detection unit 24 successively acquires a first image around the moving body 2 by the activated first camera 5 at a prescribed time interval. The detection unit 24 performs image recognition processing for the first image photographed by the first camera 5, and determines whether or not the entity is a person. When the entity is a person, the detection unit 24 determines whether or not the person is approaching the moving body 2 from the first image successively photographed by the first camera 5. When the person is approaching the moving body 2, the detection unit 24 determines the person as the target person P. Thus, the detection unit 24 detects the target person P approaching the moving body 2. When the target person P is detected, the detection unit 24 notifies the acquisition unit 25 of that effect. In an example illustrated in FIG. 3, the detection unit 24 determines that the entity is a person approaching the moving body 2 while the entity detected by the object detection sensor 4 advances to a position at a distance D2 from the moving body 2, and notifies the acquisition unit 25 of that the target person P is detected when the person reaches the position at the distance D2.

The acquisition unit 25 repeatedly acquires a face image of the target person P approaching the moving body 2, who is detected by the detection unit 24, at the prescribed time interval by the second camera 6.

Specifically, when the target person P is detected in the detection unit 24, the acquisition unit 25 activates the second camera 6 near the first camera 5 used to detect the target person P, and acquires a second image of the target person P by the activated second camera 6 at the prescribed time interval. As described above, the second camera 6 has higher resolution and power consumption as compared with the first camera 5.

The acquisition unit 25 extracts the face image of the target person P from the second image every time the second image of the target person P is photographed, and acquires the plurality of face images of the target person P captured at the prescribed time interval. Every time the second image of the target person P is photographed, the acquisition unit 25 sends the photographed image of the target person P and the extracted face image to the determination unit 26 and the authentication unit 27.

The determination unit 26 determines presence/absence of an intention of the target person P to board the moving body 2 based on movement of the target person P recognized from the plurality of second images captured at the prescribed time interval. For example, the determination unit 26 can determine that the target person P has an intention to board the moving body 2 when the target person P is approaching one of the doors 8 of the moving body 2 further, when the target person P stops in front of one of the doors 8 of the moving body 2, and when the target person P reaches his/her hand to a doorknob of one of the doors 8 or the like.

In an example illustrated in FIG. 3, the determination unit 26 determines the presence/absence of the boarding intention of the target person P at a position at a distance D3 from the moving body 2, for example.

The determination unit 26 notifies the authentication unit 27 of a result of determining the presence/absence of the intention of the target person P to board the moving body 2.

The authentication unit 27 authenticates that the target person P is the registered user based on the face image of the target person P extracted from the second image.

Specifically, the authentication unit 27 calculates a feature amount of the face image for the face image acquired by the acquisition unit 25, and calculates, for each registered user, a correlation score indicating a degree of coincidence between the calculated feature amount (target feature amount, hereinafter) and a feature amount of the face image preserved in the authentication data 23 of each registered user stored in the memory 21.

Then, the authentication unit 27 determines whether or not the target person P is one of the registered users based on the calculated correlation scores. Specifically, for example, when there are correlation scores equal to or higher than a first prescribed value in the calculated correlation scores, the authentication unit 27 determines that the target person P is the registered user corresponding to the correlation score indicating a highest value among the correlation scores equal to or higher than the first prescribed value. On the other hand, when there are no correlation scores equal to or higher than the first prescribed value in the calculated correlation scores, the authentication unit 27 determines that the target person P is not a registered user.

In the present embodiment, the authentication unit 27 calculates the correlation score for each of the prescribed number of face images of the target person P that are successively photographed, and determines presence/absence of the registered user corresponding to the target person P based on the calculated correlation score. Then, when the registered user corresponding to the target person P determined for each of the prescribed number of face images is the same one registered user with a possibility of a prescribed value or higher in the prescribed number of face images, the authentication unit 27 determines that the target person P is the one registered user. Thus, the authentication for the target person P becomes a success. On the other hand, when the authentication unit 27 cannot specify the one registered user, it is determined that the target person P is not a registered user. That is, the authentication for the target person P becomes a failure.

Note that a face image acquisition operation in the acquisition unit 25 and an authentication operation based on the acquired face image in the authentication unit 27 may be started simultaneously with start of an image acquisition operation from the second camera 6 in the detection unit 24.

In the present embodiment, in particular, when the authentication for the target person P becomes a failure based on the predetermined prescribed number of face images, the authentication unit 27 repeats the authentication operation for the target person P for each of the prescribed number of face images photographed thereafter until the authentication becomes a success. Every time the authentication operation for the target person P is executed, the authentication unit 27 outputs a notice indicating whether an authentication result is a failure or a success from the output device 7 near the target person P. For example, the authentication unit 27 outputs the notice by lighting the output device 7 which is a light emitting device, and changes a lighting mode of the light emitting device according to the authentication result. In the present embodiment, the light emitting device is an LED. Specifically, for example, the authentication unit 27 may notify the authentication result of the target person P by making the output device 7, which is the LED, flicker when the authentication result is a failure, and lighting the output device 7, which is the LED, when the authentication result is a success.

Specifically, the authentication unit 27 counts the number of times of the authentication operation performed from when the authentication operation for the target person P is started to when the authentication becomes a success as a number NR of times of retries. Then, when the authentication becomes a success, the authentication unit 27 sends the number NR of times of retries to the control unit 28 together with the notice indicating that the authentication is a success. Here, when the number NR of times of retries becomes equal to or more than a predetermined first prescribed number of times without the authentication becoming a success, the authentication unit 27 may end the authentication operation.

The control unit 28 controls the operation of the moving body 2.

In the present embodiment, in particular, in the case where the authentication of the target person P is a success in the authentication unit 27, when the determination unit 26 determines that the target person P has a boarding intention, the control unit 28 instructs the door switch 9 of the moving body 2 to automatically unlock the door 8 (automatic unlocking), and automatically opens the door 8 (automatic opening operation). The control unit 28 executes the automatic unlocking and the automatic opening operation with the door 8 closest to the target person P as a target. The door 8 closest to the target person P can be specified from the lately acquired second image and notified to the control unit 28 by the acquisition unit 25, for example.

In the present embodiment, in particular, when the authentication becomes a success after the authentication becomes a failure for a predetermined prescribed number of times in the authentication unit 27, the control unit 28 makes a mode of movement of the door 8 at the time of automatically opening the door 8 different from a mode when the authentication becomes a success with the number of times less than the prescribed number of times in the authentication unit 27. For example, when the number NR of times of retries in the authentication unit 27 is equal to or more than a predetermined second prescribed number of times less than the first prescribed number of times, the control unit 28 makes the mode of the movement of the door 8 in the automatic opening operation of the door 8 different from the mode when the number NR of times of retries is less than the second prescribed number of times.

Hereinafter, the mode of the automatic opening operation for the door 8 executed by the control unit 28 when the number NR of times of retries is equal to or more than the second prescribed number of times is referred to as a first mode, and the mode of the automatic opening operation for the door 8 executed by the control unit 28 when the number NR of times of retries is less than the second prescribed number of times is referred to as a second mode.

Specifically, for example, as the first mode of the automatic door opening operation when the number NR of times of retries in the authentication unit 27 is equal to or more than the second prescribed number of times, the control unit 28 makes a time period from when the output device 7 outputs the notice of an authentication success to when the door 8 is automatically opened longer than a time period in the second mode of the automatic door opening operation when the number NR of times of retries is less than the second prescribed number of times.

Alternatively, as the first mode when the number NR of times of retries in the authentication unit 27 is equal to or more than the second prescribed number of times, the control unit 28 may make a speed of opening the door 8 at the time of automatically opening the door 8 slower than a speed in the second mode when the number NR of times of retries is less than the second prescribed number. The speed of opening the door 8 may be, for example, an angular speed of an opening angle centered on a hinge of the door 8, which is a hinge door, or a moving speed of an end portion of the door 8 on a side facing the hinge.

Alternatively, as the first mode when the number NR of times of retries in the authentication unit 27 is equal to or more than the second prescribed number of times, the control unit 28 may make a time period from when the door 8 is automatically unlocked to when the door 8 is automatically opened longer than a time period in the second mode when the number NR of times of retries is less than the second prescribed number of times.

Further, alternatively, as the first mode when the number NR of times of retries in the authentication unit 27 is equal to or more than the second prescribed number of times, the control unit 28 may stop the movement of opening the door 8 for prescribed time in a middle state before the door 8 is turned to a prescribed fully open state in the automatic opening operation of the door 8. On the other hand, as the second mode when the number NR of times of retries is less than the second prescribed number of times, the control unit 28 may open the door 8 to the fully open state without stopping the movement of the door 8 in the middle state.

[3. Operation of Entry System]

Next, a procedure of the operation of the entry system 1 will be described.

FIG. 4 is a flowchart illustrating a procedure of an entry control method executed by a computer of the entry system 1. The computer of the entry system 1 is the processor 20 of the entry controller 3 as an example in the present embodiment.

Processing illustrated in FIG. 4 is started when power sources of respective instruments illustrated in FIG. 2 including the entry controller 3 are turned on, and is repeatedly executed.

When the processing is started, first, the detection unit 24 determines whether or not the target person P approaching the moving body 2 is detected (S100). As described above, the detection unit 24 can detect the target person P using the object detection sensor 4 and the first camera 5. Then, when the target person P is not detected (S100, NO), the detection unit 24 returns to step S100 and repeats the processing.

On the other hand, when the target person P is detected (S100, YES), the acquisition unit 25 starts acquisition of the second image of the target person P by the second camera 6 (S102). Thereafter, the acquisition unit 25 repeatedly acquires the second image of the target person P at the prescribed time interval. In addition, the acquisition unit 25 sends the photographed image of the target person P and the face image of the target person P extracted from the second image to the authentication unit 27 every time the second image of the target person P is photographed.

The authentication unit 27 resets the number NR of times of retries to zero (S104), and then starts the authentication operation for the target person P. The authentication unit 27 first acquires the prescribed number of temporally successive face images of the target person P from the second image received from the acquisition unit 25 (S106), and authenticates the target person P based on the prescribed number of acquired face images (S108). The authentication unit 27 outputs the notice of the authentication result for the target person P from the output device 7 near the target person P (S110), and determines whether or not the authentication result is a success (S112).

Then, when the authentication result is a failure (S112, NO), the authentication unit 27 increments the number NR of times of retries by adding 1 (S114), and determines whether or not the number NR of times of retries is equal to or more than the first prescribed number of times (S116). Then, when the number NR of times of retries is equal to or more than the first prescribed number of times (S116, YES), the authentication unit 27 ends the present processing. On the other hand, when the number NR of times of retries is less than the first prescribed number of times (S116, NO), the authentication unit 27 returns the processing to step S106. Thus, the authentication unit 27 acquires the prescribed number of face images of the target person P anew from the second image subsequently acquired by the acquisition unit 25, and repeats the authentication operation.

On the other hand, when the authentication result is a success in step S112 (S112, YES), the control unit 28 determines whether or not the number NR of times of retries is equal to or more than the second prescribed number of times (S118). Then, when the number NR of times of retries is equal to or more than the second prescribed number of times (S118, YES), the control unit 28 instructs the door switch 9 of the door 8 near the target person P, executes the automatic opening operation of the door 8 in the first mode (S120), and ends the present processing.

Meanwhile, when the number NR of times of retries is less than the second prescribed number of times (S118, NO), the control unit 28 instructs the door switch 9 of the door 8 near the target person P, executes the automatic opening operation of the door 8 in the second mode (S122), and ends the present processing.

After the present processing is ended, the processor 20 of the entry controller 3 repeats the processing from step S100 anew.

Here, in FIG. 4, step S102 corresponds to an acquisition step in the present disclosure. In addition, steps S106 to S110 correspond to an authentication step in the present disclosure. Further, steps S118 to S122 correspond to a control step in the present disclosure.

Other Embodiments

When authenticating the target person P, the authentication unit 27 may perform so-called liveness determination on whether or not the face image of the target person P is an image of an actual face of the target person P. When it is determined that the acquired face image is not the image of the actual face of the target person P himself/herself and is, for example, an image of a head part of a third person wearing a mask on which a face photo is printed or the like in the liveness determination, the authentication unit 27 may determine that the authentication using the face image as a failure.

Specifically, the authentication unit 27 may authenticate whether or not the target person P is a registered user based on the face images on condition that respective hues of the face images extracted from each of the plurality of images successively captured from the second camera 6 by the detection unit 24 at the prescribed time interval and/or time-sequential brightness distribution change of the face images satisfies a predetermined standard, for example. Here, for example, the standard may be that the hue that the face image has is not the hue peculiar to a printed matter and/or that illumination to the face of the target person P recognized from the plurality of time-sequential face images successively changes without inconsistency, or the like.

Thus, for example, it is possible to effectively prevent the target person P who intends to perform unauthorized entry into the moving body 2, for example, by wearing a mask printed with a face image of a registered user who is a different person.

The authentication unit 27 may authenticate that the target person P is a registered user when the determination unit 26 determines that the target person P has an intention to board the moving body 2. Thus, it is possible to prevent the authentication unit 27 from unnecessarily authenticating a person who is not trying to board the moving body 2 as the target person P.

Note that the present invention is not limited to the configuration of the embodiments described above, and can be implemented in various modes without deviating from the gist.

[5. Configurations Supported by Embodiments Described Above]

The embodiments described above support the following configurations.

(Configuration 1) An entry system including: a camera provided in a moving body; an output device provided in the moving body and configured to output a notice to outside of the moving body; an acquisition unit configured to repeatedly acquire a face image of a target person approaching the moving body from the camera; an authentication unit configured to authenticate that the target person is a registered user based on the face image; and a control unit configured to automatically open a door of the moving body when the authentication unit succeeds in authentication, wherein the authentication unit outputs the notice indicating whether or not the authentication is a success from the output device every time the authentication is executed, and when the authentication becomes a success after the authentication becomes a failure for a predetermined prescribed number of times in the authentication unit, the control unit makes a mode of movement of the door at the time of automatically opening the door different from a mode when the authentication becomes a success with the number of times less than the prescribed number of times in the authentication unit.

According to the entry system of configuration 1, when the authentication becomes a success after becoming a failure for the prescribed number of times, the mode of the automatic door opening operation is changed from the mode when the authentication becomes a success with the number of times less than the prescribed number of times so that the movement of the automatic door opening operation when the authentication is a success can be the operation that is safe and secure for the user even in the case where an approach distance between the user and the door becomes short depending on the number of times of the notice of an authentication failure.

(Configuration 2) The entry system according to configuration 1, wherein when the authentication becomes a success after the authentication becomes a failure for the prescribed number of times in the authentication unit, the control unit makes a time period from when the output device outputs the notice to when the door is opened longer than a time period when the authentication becomes a success with the number of times less than the prescribed number of times in the authentication unit.

According to the entry system of configuration 2, when the authentication becomes a success after becoming a failure for the prescribed number of times, the time period from notice output of the authentication success to the start of the automatic door opening operation is made longer so that the time for the target person who has gotten too close to the door to move away from the door to be at a safe distance (the distance not to contact the door) can be secured.

(Configuration 3) The entry system according to configuration 1 or 2, wherein when the authentication becomes a success after the authentication becomes a failure for the prescribed number of times in the authentication unit, the control unit makes a speed of automatically opening the door slower than a speed when the authentication becomes a success with the number of times less than the prescribed number of times in the authentication unit.

According to the entry system of configuration 3, when the authentication becomes a success after becoming a failure for the prescribed number of times, the speed of the automatic door opening operation from the notice output of the authentication success is made slower so that the target person who has gotten too close to the door can move away to be at the safe distance without contacting the door even in the case of starting to move after noticing the start of the automatic door opening operation.

(Configuration 4) The entry system according to any one of configurations 1 to 3, wherein when the authentication becomes a success after the authentication becomes a failure for the prescribed number of times in the authentication unit, the control unit makes a time period from when the door is automatically unlocked to when the door is automatically opened longer than a time period when the authentication becomes a success with the number of times less than the prescribed number of times in the authentication unit.

According to the entry system of configuration 4, when the authentication becomes a success after becoming a failure for the prescribed number of times, the time period from the automatic unlocking of the door to the start of the automatic opening operation is made longer so that the target person who has gotten too close to the door can move away to be at the safe distance without contacting the door even in the case of starting to move after noticing the start of the automatic opening operation by door unlocking sound.

(Configuration 5) The entry system according to any one of configurations 1 to 4, wherein when the authentication becomes a success after the authentication becomes a failure for the prescribed number of times in the authentication unit, the control unit stops movement of opening the door for prescribed time in a middle state before the door is turned to a prescribed fully open state, and when the authentication becomes a success with the number of times less than the prescribed number of times in the authentication unit, opens the door to the fully open state without stopping the movement of the door in the middle state.

According to the entry system of configuration 5, when the authentication becomes a success after becoming a failure for the prescribed number of times, the door is tentatively stopped in the middle state before reaching the fully open state at the time of automatically opening the door so that the time for the target person to appropriately recognize the safe distance from the door can be secured.

(Configuration 6) The entry system according to any one of configurations 1 to 5, wherein the output device is a light emitting device, and the authentication unit outputs the notice by lighting the output device which is the light emitting device, and changes a lighting mode of the light emitting device according to a result of the authentication.

According to the entry system of configuration 6, the target person can easily recognize whether the authentication is a success or a failure by a difference of the lighting mode of the light emitting device.

(Configuration 7) The entry system according to any one of configurations 1 to 6, wherein the door of the moving body is a hinge door.

According to the entry system of configuration 7, in the case where the door of the moving body is a hinge door for which the safe distance in the automatic opening operation is relatively long, the movement of the automatic door opening operation when the authentication is a success can be the operation that is safe and secure for the user.

(Configuration 8) An entry control method conducted by a computer of an entry system which controls an opening/closing operation of a door of a moving body, the method including: an acquisition step of repeatedly acquiring a face image of a target person approaching the moving body from a camera provided in the moving body; an authentication step of authenticating that the target person is a registered user based on the face image; and a control step of automatically opening the door of the moving body when the authentication is a success in the authentication step, wherein in the authentication step, a notice indicating whether or not the authentication is a success is output from an output device provided in the moving body to outside of the moving body every time the authentication is executed, and in the control step, when the authentication becomes a success after the authentication becomes a failure for a predetermined prescribed number of times in the authentication step, a mode of movement of the door at the time of automatically opening the door is made different from a mode when the authentication becomes a success with the number of times less than the prescribed number of times in the authentication step.

According to the entry control method of configuration 8, the movement of the automatic door opening operation when the authentication is a success can be the operation that is safe and secure for the user even in the case where an approach distance between the user and the door becomes short depending on the number of times of the notice of an authentication failure.

REFERENCE SIGNS LIST

1 . . . entry system, 2 . . . moving body, 3 . . . entry controller, 4 . . . object detection sensor, **4*a* . . . right object detection sensor, 4*b* . . . left object detection sensor, 4*c* . . . rear object detection sensor, 5 . . . first camera, 5*a* . . . first right camera, 5*b* . . . first left camera, 5*c* . . . first rear camera, 6** . . . second camera,

6*a* . . . second right camera, 6*b* . . . second left camera, 6*c* . . . second rear camera, 7 . . . output device, 7*a* . . . right output device, 7*b* . . . left output device, 7*c* . . . rear output device, 8 . . . door, 8*a* . . . driver's seat door, 8*b* . . . right rear seat door, 8*c* . . . passenger seat door, 8*d* . . . left rear seat door, 8*e* . . . back door, 9 . . . door switch, 9*a* . . . right front door switch, 9*b* . . . right rear door switch, 9*c* . . . left front door switch, 9*d* . . . left rear door switch, 9*e* . . . back door switch, 10 . . . communication device, 20 . . . processor, 21 . . . memory, 22 . . . program, 23 . . . authentication data, 24 . . . detection unit, 25 . . . acquisition unit, 26 . . . determination unit, 27 . . . authentication unit, 28 . . . control unit.

The invention claimed is:

1. An entry system comprising:

a camera provided in a moving body;

an output device provided in the moving body and configured to output a notice to outside of the moving body;

an acquisition unit configured to repeatedly acquire a face image of a target person approaching the moving body from the camera;

an authentication unit configured to authenticate that the target person is a registered user based on the face image; and a control unit configured to automatically open a door of the moving body when the authentication unit succeeds in authentication, wherein the authentication unit outputs the notice indicating whether or not the authentication is a success from the output device every time the authentication is executed, and when the authentication becomes a success after the authentication becomes a failure for a predetermined prescribed number of times in the authentication unit, the control unit makes a mode of movement of the door at the time of automatically opening the door different from a mode when the authentication becomes a success with the number of times less than the prescribed number of times in the authentication unit.

2. The entry system according to claim 1, wherein when the authentication becomes a success after the authentication becomes a failure for the prescribed number of times in the authentication unit, the control unit makes a time period from when the output device outputs the notice to when the door is opened longer than a time period when the authentication becomes a success with the number of times less than the prescribed number of times in the authentication unit.

3. The entry system according to claim 1, wherein when the authentication becomes a success after the authentication becomes a failure for the prescribed number of times in the authentication unit, the control unit makes a speed of automatically opening the door slower than a speed when the authentication becomes a success with the number of times less than the prescribed number of times in the authentication unit.

4. The entry system according to claim 1, wherein when the authentication becomes a success after the authentication becomes a failure for the prescribed number of times in the authentication unit, the control unit makes a time period from when the door is automatically unlocked to when the door is automatically opened longer than a time period when the authentication becomes a success with the number of times less than the prescribed number of times in the authentication unit.

5. The entry system according to claim 1, wherein when the authentication becomes a success after the authentication becomes a failure for the prescribed number of times in the authentication unit, the control unit stops movement of opening the door for a prescribed time in a middle state before the door is turned to a prescribed fully open state, and when the authentication becomes a success with the number of times less than the prescribed number of times in the authentication unit, opens the door to the fully open state without stopping the movement of the door in the middle state.

6. The entry system according to claim 1, wherein the output device is a light emitting device, and the authentication unit outputs the notice by lighting the output device which is the light emitting device, and changes a lighting mode of the light emitting device according to a result of the authentication.

7. The entry system according to claim 1, wherein the door of the moving body is a hinge door.

8. An entry control method conducted by a computer of an entry system which controls an opening/closing operation of a door of a moving body, the method comprising:

an acquisition step of repeatedly acquiring a face image of a target person approaching the moving body from a camera provided in the moving body;

an authentication step of authenticating that the target person is a registered user based on the face image; and a control step of automatically opening the door of the moving body when the authentication is a success in the authentication step, wherein in the authentication step, a notice indicating whether or not the authentication is a success is output from an output device provided in the moving body to outside of the moving body every time the authentication is executed, and in the control step, when the authentication becomes a success after the authentication becomes a failure for a predetermined prescribed number of times in the authentication step, a mode of movement of the door at the time of automatically opening the door is made different from a mode when the authentication becomes a success with the number of times less than the prescribed number of times in the authentication step.

* * * * *